United States Patent Office 3,311,497
Patented Mar. 28, 1967

3,311,497
SURFACE TREATING OF ALKENYL AROMATIC RESINOUS FILM TO PROVIDE A MATTE FINISHED INK RECEPTIVE SURFACE THEREON
William R. R. Park, Midland, Mich., assignor to The Dow Chemical Company, Midland, Mich., a corporation of Delaware
No Drawing. Filed Jan. 9, 1961, Ser. No. 81,234
7 Claims. (Cl. 117—138.8)

This invention relates to a method of treating the surfaces of alkenyl aromatic resinous film to give an improved water and alcohol based ink receptive matte finish and the product obtained thereby.

Alkenyl Aromatic Resinous Polymer Film
↓
Treat surface of film with a mixture of volatile organic liquid and ink receptive resinous polymer until surface is swelled by organic liquid.
↓
Removing the organic liquid to leave an ink receptive matte surface In the past, matte surfaces were prepared by the treatment of a shaped article with a solvent such as acetone for a short period of time or by roughening the surface by sand blasting or other abrasive means. Such procedures are described in British patent specification No. 440,926.

Film of alkenyl aromatic resin prepared with a matte surface may be written on with conventional pen and ink; the line left by the trace of the pen nib or point on the surface of the article, however, is generally light and rather pale. Such a line is similar in appearance to the trace left by a pen filled with writing ink when passed over the surface of a clean, relatively flat glass surface. By relatively flat glass surface is meant a surface similar to that found on window glass of both the plate and blown glass types.

Matte surfaced alkenyl aromatic resinous film or sheet accept a readable trace from the pen, but the color or darkness of the trace is substantially below that obtained on conventional bond or other writing paper.

When film fabricated from alkenyl aromatic resins are treated with hydrophylic systems in an attempt to improve the writing ink receptivity, writing ink tends to spread on the sheet due to the wetting action of the surface active material employed, uncontrolled spreading of the ink results in unsatisfactory and unsightly markings, and frequently illegibility of the characters.

It is an object of this invention to provide a sheet prepared from an alkenyl aromatic resin having a matte finish and improved surface characteristics for marking with conventional writing inks.

It is another object of this invention to provide a simple two step process for the preparation of improved writing ink writable matte surfaced alkenyl aromatic film.

It is a further object of this invention to provide a simple two step process for the preparation of improved writing ink writable matte surfaced alkenyl aromatic film.

These benefits and other advantages may be obtained by treating the surface of a film prepared from an alkenyl aromatic polymer resin to a mixture comprising an organic liquid medium which is a swelling agent for said alkenyl aromatic resin, having dispersed therein an ink receptive resinous polymeric material, until the surface of said film is swollen by said swelling agent and subsequently removing the volatile components of said mixture from said article.

The invention is particularly adapted to be practiced with swellable, integral, solid styrene polymer film 0.5–10 mils, preferably from 0.5–2. Such a polymer, which may have an essentially linear molecular configuration, is employed herein as being generally representative of alkenyl aromatic compounds of the type that contain at least about 50 weight percent of at least one polymerized alkenyl aromatic compound or monomer having the general formula:

$$Ar-CR=CH_2$$

wherein R is a hydrogen or methyl and Ar is an aromatic radical, advantageously of the benzene series, of from 6 to 10 carbon atoms (including the carbon atoms in any ring substituents on the aromatic nucleus). Thermoplastic homopolymers and copolymers of styrene, α-methyl styrene, ar-methyl styrene (or vinyl toluene), the several mono- and di-chloro-styrenes and ar-dimethyl styrenes, may frequently be utilized with benefits commensurate with or in excess of those which are derivable from employment of polystrene alone.

A wide variety of organic swelling agents may be employed in the practice of the invention. Acetone is particularly suitable for the practice of this invention. Ketone compounds such as methyl isobutyl ketone, methyl ethyl ketone, and the like may also be used with good results. Various solvent mixtures are successfully employed which comprise a swelling agent in admixture with other swelling agents or substantially inert diluents such as water, alcohols and the like.

A mixture of swelling agents and nonsolvents which is eminently successful in the practice of the invention comprises 2 parts of ethanol, 1 part butanol, 1 part methyl isobutyl ketone, 1 part ethyl acetate, and 2 parts toluene. A choice of the particular swelling agent or mixtures thereof with or without diluents used will depend on the particular alkenyl aromatic resin employed, the time of exposure desired, and the temperature of the bath. Usually, it is most advantageous to employ, for dispersion of the ink receptive resinous polymeric material and subsequent treatment of an alkenyl aromatic resin article, swelling agents or swelling agent containing mixtures that boil under atmospheric pressure below about 135° C. and above about 40° C.

A wide variety of polymer resin materials may be employed as the ink receptive resinous polymeric material in the practice of the invention. Copolymers prepared from such monomer systems as vinylidene chlorideacrylonitrile, vinyl chloride-vinyl acetate, vinyl chloride-vinyl propionate, vinyl chloride-maleic anhydride, vinyl chloride-diethyl maleate are typical materials that may be employed. Other suitable copolymers are prepared from vinyl chloride-methyl methacrylate, vinyl chloride-ethyl acrylate, vinylidene chloride wtih various methacrylate, acrylate, and maleate esters. Also, ternary and quaternary copolymers and of the foregoing monomers may be employed beneficially in the practice of the invention. Various ethers, such as, for example, condensation products of bisphenols and epichlorohydrin, nitrocellulose, polyvinyl butyral and polyvinyl acetals, and also polyester compositions containing an aromatic nucleus as an integral unit in the polymer molecule may also be employed.

The number of the synthetic resinous materials which may be adapted to the practice of the invention are varied and have in common the property of accepting conventional writing ink to a limited degree. Any polymeric material is readily determined to be usable or unusable in the process for preparing a satisfactory writing ink receptive surface on an alkenyl aromatic shaped article by the following test:

A synthetic resinous material to be evaluated is molded or solvent cast to a shape into a form which has at least one relatively smooth surface. The writing pen containing an ink is drawn across the smooth surface of the polymeric material in conventional writing manner. If the line left by the pen nib remains constant in width and shows continuity of the ink film to the unaided eye, the material is satisfactory to be employed in treating alkenyl aromatic articles in accordance with the invention. The solubility of the treating resin must be such that it is soluble or readily dispersible in the solvents or solvent system employed for matte surfaces with alkenyl aromatic articles. Any commercially available writing ink may be employed in this test; however, the most discriminating of the commercially available inks appears to be the writing ink sold under the trade name of "Parker 51."

Advantageously, articles treated in accordance with the invention may be simultaneously destaticized by adding to the treating medium an alkali metal salt of a sulfonated alkenyl aromatic resin dispersable or soluble therein. Such salts are usually prepared by the sulfonation and subsequent neutralization of polymers such as polystyrene, which have an essentially linear molecular configuration. Such polymers, on sulfonation usually contain between about 0.1 and 1.5 sulfonate groups per alkenyl aromatic monomer units and have a molecular weight between about 50,000 and 750,000 molecular weight units.

A surface treating solution or dispersion is readily prepared by dissolving the resinous treating material in the solvent mixture by dissolving or dispersing the resinous treating material in the solvent or solvent system employed to form the matte surface on an alkenyl aromatic resin article. The concentration of treating resin and a solvent may usually be from about 0.05 percent to about 5 percent and advantageously between about 0.1 percent to about 2 percent and beneficially from about 0.2 percent to 0.5 percent. Dissolution of the treated resin in the treating medium may be accomplished by any of the conventional methods, such as heating, with or without agitation, agitation alone, or mechanical dispersion of the resin throughout the medium by mechanical means such as colloid mills and the like. Frequently, it may be advantageous to form a concentrate of the resinous material in a portion of the treating medium at concentration of 25 percent or even about 50 percent based on the total weight of the concentrate.

Alternatively, a surface treating solution in a dispersion which would result in the static free alkenyl aromatic writable article is readily prepared by incorporating into the treating medium a concentrate which may be prepared by first dispersing an aqueous solution of the alkali metal salt of a sulfonated alkenyl aromatic resin in a minor portion of the organic liquid medium of the treating composition and subsequently diluting to the desired concentration, usually between from about 0.1 percent to about 1 percent based on the total weight of the treating medium and advantageously between about 0.15 percent and about 0.35 percent based on the total weight of the treating medium. An aqueous solution of the alkali metal salts of the sulfonated alkenyl aromatic resins advantageously may be dissolved or dispersed in a portion of the treating liquid or, if a multicomponent mixture is employed, in a portion of any one or all of the liquid components by employing highspeed agitation for a period of time which is dependent on the particular liquid system or dispersing medium employed and the molecular weight of the alkali metal salt of the sulfonated alkenyl aromatic resin.

Generally, it is advantageous to treat the surface at a temperature with the treating medium within a temperature range of from about 0° C. to about 60° C. It is frequently desirable to employ a temperature range from about 5° C. to about 30° C. and oftentimes beneficial to employ a range of from about 5° C. to 15° C. A particular temperature which is most beneficial for any specific treating solution or dispersion and any specific alkenyl aromatic resin will depend in part upon the specific characteristics of the swelling agents employed in the treating composition and partly on the swelling characteristics of the alkenyl aromatic resin. Film prepared from higher molecular weight alkenyl aromatic resins generally require a longer time and a higher temperature in contact with the treating composition than lower molecular weight resins. Similarly, a highly active swelling agent will require a relaively shorter contact than would a less active swelling agent.

In the practice of the invention, various methods may be employed in applying the treating composition to the surface of shaped alkenyl aromatic resins. It is frequently advantageous to dip the film in a bath of a suitable treating composition whereas alternately sheets or films may be treated by dipping, rolling, spraying, or brushing the treating medium or composition onto the surface of the polymer.

The volatile components of the treating composition are readily removed from the treated surface by evaporation. Frequently, exposure of the treated surface to air is sufficient, but, often, particularly when continuous operation is contemplated, an air blast directed toward the surface being treated is particularly advantageous.

*Example I*

150 grams of a 10 percent acetone solution of a copolymer prepared from 80 parts of vinylidene chloride and 20 parts of acrylonitrile with molecular weight of about 100,000 was diluted with ten liters of acetone. 300 milliliters of methanol were added with vigorous agitation. By the foregoing procedure, a stable solution of acrylonitrile vinyl chloride copolymer was obtained in the methanol acetone mixture. Oriented polystyrene film, approximately 1 mil thick, was continually passed through a bath at a temperature of 25° C. and with a residence time of approximately 0.3 second. On emerging from the bath, excess liquid was removed by a pair of rotating wirewound metering rods, and the film dried by applying a stream of 20° C. air to each side of the film.

The resulting product readily accepted various varieties of writing ink, and ink could be readily transferred from a typewriter ribbon to a treated film. By way of contrast, the above procedure, if repeated with the omission of the acrylonitrile vinyl chloride copolymer when a writing ink was applied to the treated film by means of a fountain pen, a much lighter, discontinuous line was obtained.

*Example II*

The procedure of Example I was repeated with the exception that the following concentrate was added to the treating bath prior to its application to oriented polystyrene film:

150 grams of a 10 percent aqueous solution of sodium polystyrene sulfonate (molecular weight about 500,000) and containing about 1 sulfonate group per monomer unit was diluted with 300 milliliters of methanol. Five hundred milliliters of acetone were added slowly with vigorous agitation. By the foregoing procedure, a stable, small particle size dispersion of sodium polystyrene sulfonate in a methanol-acetone mixture was obtained.

The resultant film was found to be ink receptive and exhibited no evidence of high static charge.

*Example III*

The procedure of Example I was followed with the exception that other resins replaced the copolymer prepared from 80 parts of vinylidene chloride and 20 parts acrylonitrile. The following resins were used:

A copolymer prepared from 80 parts of vinylidene chloride and 20 parts acrylonitrile having a molecular weight of about 2000,000.

A copolymer, prepared for 75 parts of vinylidene chloride and 25 parts of acrylonitrile.

A copolymer of 90 parts vinyl chloride, and 10 parts vinyl acetate.

A copolymer of 87 parts vinyl chloride and 13 parts vinyl acetate.

A copolymer of 91 percent vinyl chloride, 3 percent vinyl acetate and hydrolyzed vinyl acetate.

Epon 1004, condensation polymer of 4,4'-iso-propylidene diphenol and epichlorohydrin.

Nitrocellulose, containing about 12 percent nitrogen, and of a 6 second viscosity grade.

B-76-1, a polyvinyl butyl resin containing about 5 to 13 percent vinyl alcohol, about 2.5 percent vinyl acetate, the remainder being vinyl butyrate.

Arochem 650, a polyester resin having a molecular weight of about 700 containing trimethylolethane, paratertiary-butylbenzoic acid, and small quantities of phthalic acid.

Alvar 7/70, a polyvinyl acetal resin containing 6 to 8 percent vinyl alcohol and 35 to 45 percent vinyl acetate, the remainder being polyvinyl alcohol.

The resulting products readily accepted various writing inks to give a firm clear line. By way of contrast, when the resin was replaced by Armid 12 (a 12 carbon atom fatty acid amide), not only was no increase in the ink receptability obtained, but the product was poorer than the untreated piece of base film. Similar results indicate that the polarity of the molecules of the additive does not permit the prediction of ink receptivity.

The effectiveness of the various resins in promoting ink receptivity is not uniform, although all gave acceptable results. Following is a tabulation of the resins of the examples in their relative order of preference:

A copolymer prepared from 80 parts of vinylidene chloride and 20 parts of acrylonitrile with molecular weight of about 100,000.

Arochem 650.

A copolymer, prepared from 75 parts of vinylidene chloride and 25 parts of acrylonitrile.

A copolymer, prepared from 80 parts of vinylidene chloride and 20 parts acrylonitrile having a molecular weight of about 200,000.

A copolymer of 91 percent vinyl chloride, 3 percent vinyl acetate and hydrolyzed vinyl acetate.

B-76-1.

Epon 1004.

A copolymer of 87 parts vinyl chloride, and 13 parts vinyl acetate.

A copolymer of 90 parts vinyl chloride, and 10 parts vinyl acetate.

As is apparent, the method is susceptible of being embodied with various alterations and modifications from that which is being described in the preceding description and specification. For this reason, it is to be understood that all of the foregoing is merely intended to be illustrative and is not to be construed or interpreted as being restrictive or otherwise limitative of the present invention except as set forth in the appended claims.

What is claimed is:

1. Method of preparing a matte writing ink receptive surface on an oriented film prepared from an alkenyl aromatic polymer resin consisting essentially of: treating the surface of a film prepared from an alkenyl aromatic polymer resin with a mixture comprising a volatile organic liquid medium which is a swelling agent for said alkenyl aromatic resin; said swelling agent boiling between about 40° centigrade and about 135° centigrade, the film is contacted with the treating medium within a temperature range of from about 0° to about 60° centigrade said mixture having dispersed therein from about 0.05 percent to about 5 percent by weight of an ink receptive resinous polymeric material, until the surface of said article is swollen by said swelling agent and subsequently removing by evaporation in an air blast the volatile component of said mixture from said article, to form from said alkenyl aromatic resin a matte surface.

2. The method of claim 1, wherein said swelling agent comprises acetone.

3. The method of claim 1, wherein the ink receptive polymeric material is a copolymer of vinylidene chloride and acrylonitrile.

4. The method of claim 1, wherein the ink receptive polymeric material is nitrocellulose.

5. The method of claim 1, wherein the ink receptive polymeric material is a polyvinyl acetal resin.

6. The method of claim 1, wherein the ink receptive polymeric material is a polyester resin.

7. The method of claim 1, wherein said ink receptive resinous polymeric material is present in a proportion of from about 0.1 to about 2 percent by weight of the treating mixture.

References Cited by the Examiner

UNITED STATES PATENTS

| | | |
|---|---|---|
| 2,376,305 | 5/1945 | Bauer. |
| 2,578,683 | 12/1951 | Fiedler et al. |
| 2,578,770 | 12/1951 | Yaeger. |
| 2,758,948 | 8/1956 | Simons et al. ____ 117—138.8 X |
| 2,801,936 | 8/1957 | Bjorksten et al. |
| 2,845,405 | 7/1958 | Uraneck et al. |
| 2,872,318 | 2/1959 | Starck _____ 117—138.8 X |
| 2,873,241 | 2/1959 | Strzyzewski et al. |
| 2,955,958 | 10/1960 | Brown _____ 117—113 |
| 3,027,275 | 3/1962 | Park _____ 117—15 |
| 3,061,562 | 10/1962 | Grenley. |
| 3,101,275 | 8/1963 | Cairns et al. _____ 117—93.31 |

FOREIGN PATENTS 1,047,374   1/1952   Germany.

ALFRED L. LEAVITT, *Primary Examiner.*

RICHARD D. NEVIUS, *Examiner.*

D. TOWNSEND, J. B. SPENCER, A. H. ROSENSTEIN,
*Assistant Examiners.*